United States Patent
Shih

(10) Patent No.: US 7,711,945 B2
(45) Date of Patent: May 4, 2010

(54) UNIVERSAL COMPUTER PRODUCT HARDWARE CONFIGURATION INITIALIZATION HANDLING METHOD AND SYSTEM

(75) Inventor: Wen-Hsin Shih, Taipei (TW)

(73) Assignee: Inventec Corporation, Taipei (TW)

( * ) Notice: Subject to any disclaimer, the term of this patent is extended or adjusted under 35 U.S.C. 154(b) by 717 days.

(21) Appl. No.: 11/704,026

(22) Filed: Feb. 7, 2007

(65) Prior Publication Data

US 2008/0126586 A1 May 29, 2008

(51) Int. Cl.
*G06F 15/177* (2006.01)
(52) U.S. Cl. .......................................... 713/2; 713/100
(58) Field of Classification Search ...................... 713/2, 713/100
See application file for complete search history.

(56) References Cited

U.S. PATENT DOCUMENTS

| | | | |
|---|---|---|---|
| 6,367,007 B1 * | 4/2002 | Do | 713/2 |
| 6,658,562 B1 * | 12/2003 | Bonomo et al. | 713/1 |
| 6,718,464 B2 * | 4/2004 | Cromer et al. | 713/2 |
| 7,257,704 B2 * | 8/2007 | O'Neal | 713/2 |

* cited by examiner

*Primary Examiner*—Albert Wang
(74) *Attorney, Agent, or Firm*—Peter F. Corless; Steven M. Jensen; Edwards Angell Palmer & Dodge LLP

(57) ABSTRACT

A universal computer product hardware configuration initialization handling method and system is proposed, which is designed for use to be integrated to computer products of various different models having different hardware configurations for the purpose of providing these different models of computer products with a universal hardware configuration initialization capability. The proposed method and system is characterized by the embedding of a unique identification code that is specific to each particular model of computer product in the SMBIOS (System Management BIOS) and the embedding of the associated control programs and configuration data of all replaceable system components in the BMC (Baseboard Management Controller). This allows the initialization process of each model of computer product to first read SMBIOS for the identification code and then retrieve the corresponding set of control programs and configuration data from the SMC for system initialization.

10 Claims, 3 Drawing Sheets

UNIVERSAL COMPUTER PRODUCT HARDWARE CONFIGURATION INITIALIZATION HANDLING METHOD AND SYSTEM

BACKGROUND OF THE INVENTION

1. Field of the Invention

This invention relates to information technology (IT), and more particularly, to a universal computer product hardware configuration initialization handling method and system which is designed for use by computer products of various different models having different hardware configurations for the purpose of providing these different models of computer products with a universal hardware configuration initialization capability.

2. Description of Related Art

In the computer manufacture industry, it is a common practice for enterprise-class customers to order high-end computer products, such as network servers, workstations, desktop computers, and business-class notebook computers, that are to be manufactured based on customer-ordered specifications. In practice, different customers would typically give different specifications for their ordered computer products to be installed with specified hardware components. For example, customers may want their network servers to be installed with special types of peripheral interfaces, such as SCSI (Small Computer System Interface), ATA (Advanced Technology Attachment), SATA (Serial ATA), NIC (Network Interface Card), to name just a few. Furthermore, network servers are categorized into 1U, 2U, and 5U models based on the number of server units installed in a single chassis. Still moreover, network servers ordered by different customers may be installed with different types and quantities of hard disk drives, electrical fan units (for heat dissipation), motherboards, back planes, to name a few.

Because different models of computer products are vastly different in specifications corresponding to various different hardware configurations, it is a mandatory practice for the manufacturer to devise various different management control programs for use by network servers having different hardware configurations. However, since each management control program is specifically designed for use by a particular hardware configuration, the manufacturer needs to design a number of management control programs for use by network servers of various different hardware configurations. One drawback to this practice is that when a new hardware configuration is specified by the customer, the manufacturer needs to devise a new management control program for that particular hardware configuration. This practice is undoubtedly very tedious, laborious, and time-consuming and this highly inefficient and cost-ineffective to implement by the computer manufacturer.

SUMMARY OF THE INVENTION

It is therefore an objective of this invention to provide a universal computer product hardware configuration initialization handling method and system which can automatically load required management control program during initialization of each particular model of computer product in accordance with the particular hardware configuration of the computer product, without requiring manual setting or modification by the manufacturer, so that the manufacture of computer products can be less labor-intensive and more cost-effective.

The universal computer product hardware configuration initialization handling method and system according to the invention is designed for use with computer products of various different models having different hardware configurations for the purpose of providing these different models of computer products with a universal hardware configuration initialization handling function.

The operation of the method and system of the invention includes two stages: a manufacture stage and a utilization stage. The manufacture stage includes two operations: (M10) embedding a unique product identification code in the computer product that has been uniquely assigned to the particular model of the computer product; and (M11) prestoring a manufacturer-collected library of modularized management control programs and configuration data corresponding to a number of possible hardware configurations in the computer product. The utilization stage includes three operations: (M20) responding to a booting event on the computer product by issuing an enable message; (M21) responding to the enable message by reading the embedded product identification code in the computer product; and (M23) by using the product identification code as a keyword, retrieving the corresponding set of management control program and configuration data prestored in the computer product and loading them for initialization of the computer product.

In architecture, the universal computer product hardware configuration initialization handling system is based on a modularized architecture which comprises: (A) a product identification code embedding module, which is used to embed a unique product identification code in the computer product that has been uniquely assigned to the particular model of the computer product; (B) a management control program library module, which is used to prestore a manufacturer-collected library of modularized management control programs and configuration data corresponding to a number of possible hardware configurations for the computer product; (C) a boot responding module, which is capable of responding to a booting event on the computer product by issuing an enable message; (D) a product identification code reading module, which is capable of responding to the enable message from the boot responding module by reading the product identification code stored in the product identification code embedding module; and (E) a management control program loading module, which is capable of using the product identification code retrieved by the boot responding module as a keyword for retrieving the corresponding set of management control program and configuration data from the management control program library module and loading them for initialization of the hardware configuration of the computer product.

The universal computer product hardware configuration initialization handling method and system according to the invention is characterized by the embedding of a unique identification code that is specific to each particular model of computer product in the SMBIOS and the embedding of the associated control programs and configuration data of all replaceable system components in the BMC. This allows the initialization process of each model of computer product to first read SMBIOS for the identification code and then retrieve the corresponding set of control programs and configuration data from the SMC for system initialization.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The universal computer product hardware configuration initialization handling method and system according to the invention is disclosed in full details by way of preferred embodiments in the following with reference to the accompanying drawings.

Figure 1:
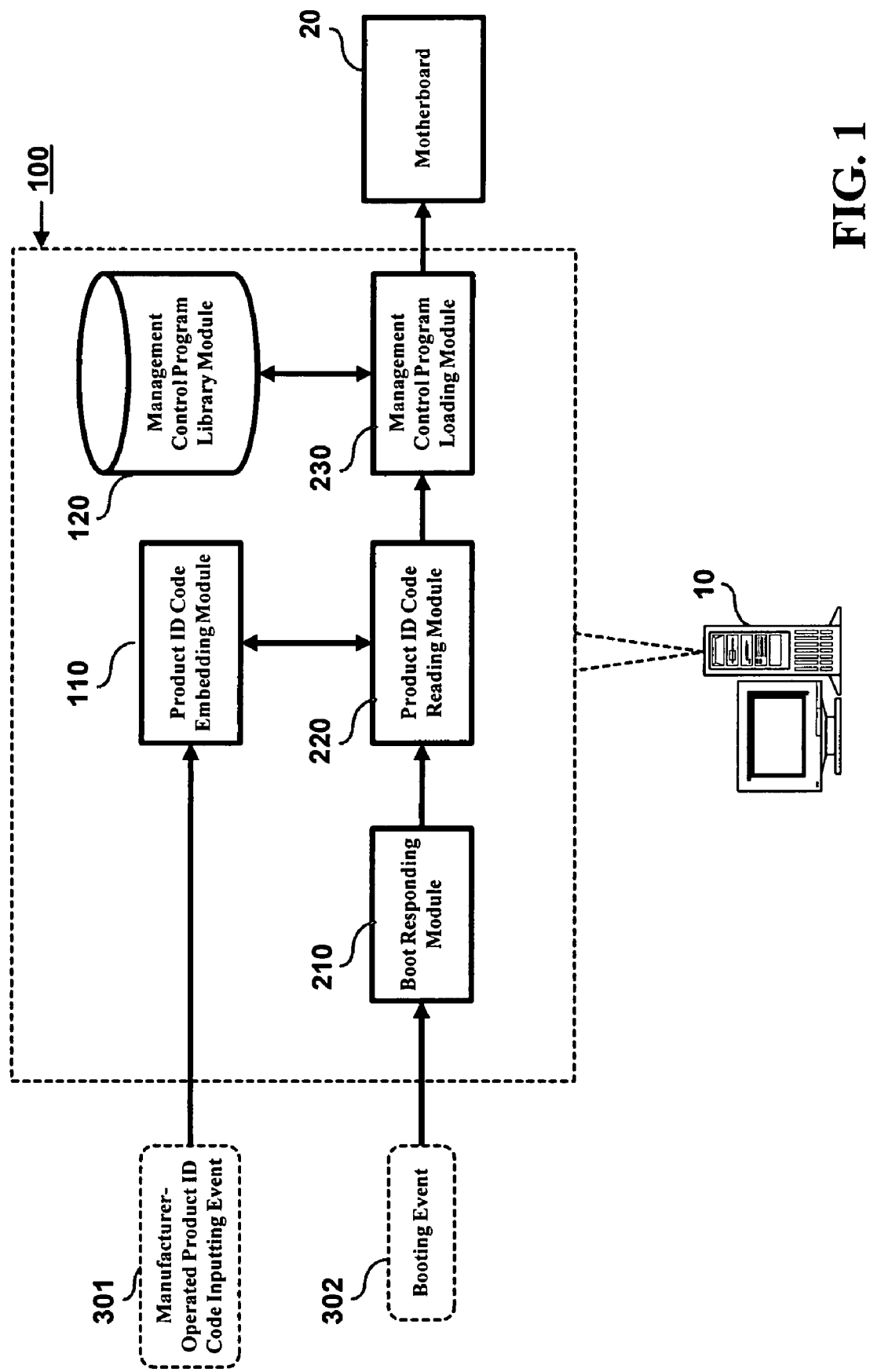
FIG. 1 is a schematic diagram showing the application and modularized architecture of the universal computer product hardware configuration initialization handling system of the invention.

FIG. 1 is a schematic diagram showing the application and modularized architecture of the universal computer product hardware configuration initialization handling system (as the part encapsulated in the dotted box indicated by the reference numeral 100). As shown, the universal computer product hardware configuration initialization handling system of the invention 100 is designed for use with a computer product 10, such as a network server, a desktop computer, or a notebook computer that can be selectively configurable with various different hardware configurations.

In actual operation, the universal computer product hardware configuration initialization handling system of the invention 100 can provide the computer product 10 with a universal hardware configuration initialization capability that allows the computer product 10 to be able to be initialized during power-on startup irrespective of its current hardware configuration, i.e., no matter how the computer product 10 is changed in hardware configuration by adding new hardware components, the computer product 10 can nevertheless provide initialization for the newly-added hardware components.

Figure 2:
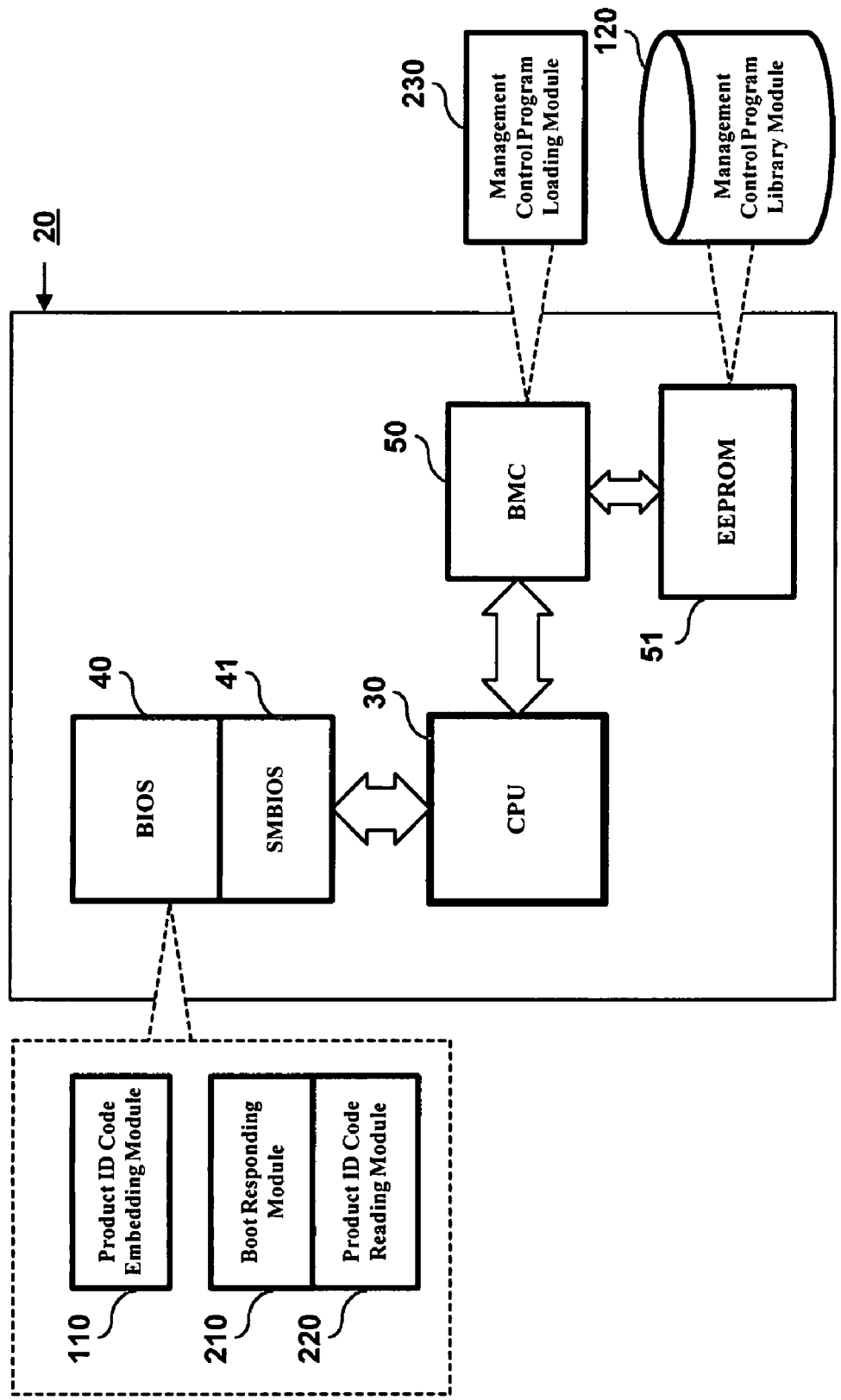
FIG. 2 is a schematic diagram showing the implementation of the universal computer product hardware configuration initialization handling system of the invention on the motherboard of a computer product.

As shown in FIG. 2, the universal computer product hardware configuration initialization handling system of the invention 100 is integrated in a distributed manner to a computer motherboard 20, such as a network server's main logic board (MLB), that is equipped with a CPU 30, a BIOS (Basic Input/Output System) module 40, and a BMC (Baseboard Management Controller) module 50. The BIOS module 40 is implemented with computer code embedded in a flash memory and includes an extended partition called SMBIOS (System Management BIOS) 41. The BMC module 50 is a control chip which includes an non-volatile memory module such as EEPROM (Electrically Erasable and Programmable Read-Only Memory) module 51 for storage of management control programs and associated configuration data. Further, the BMC module 50 communicates with the CPU 30 via a bus interface such as KCS (Keyboard Controller Style) bus interface.

As shown in FIG. 1, the universal computer product hardware configuration initialization handling system of the invention 100 is based on a modularized architecture which comprises: (A) a product ID code embedding module 110; (B) a management control program library module 120; (C) a boot responding module 210; (D) a product ID code reading module 220; and (E) a management control program loading module 230. Firstly, the respective attributes and behaviors of these constituent modules are described in details in the following.

The product ID code embedding module 110 is used to allow the manufacturer of the computer product 10 to embed a unique product ID code (denoted by SKU_ID) that has been uniquely assigned to the particular model of the computer product 10. In the final stage of the manufacture of the computer product 10, the manufacturer can activate the product ID code embedding module 110 and then use it to input the product ID code (which initiates a manufacturer-operated product ID code inputting event 301 on the computer product 10), and the product ID code embedding module 110 will embed the inputted product ID code in the BIOS module 40. In advance, the manufacturer needs to assign each particular model of the computer product 10 (i.e., each particular hardware configuration of the computer product) with a unique product ID code, such as the unique stock keeping unit (SKU) number of the computer product 10, and use the SKU number as the product ID code for embedding to the computer product 10. As shown in FIG. 2, in practical implementation, for example, the SKU_ID code is embedded with the format of SMBIOS Type 11 data structure in the SMBIOS partition 41 of the BIOS module 40.

The management control program library module 120 is used to prestore a manufacturer-collected library of modularized management control programs and their associated configuration data, wherein each set of control program and configuration data corresponds to one of a number of different hardware components and which can be executed by the BMC module 50 to control the operations of the hardware components currently installed on the computer product 10. As shown in FIG. 2, in practical implementation, for example, the management control program library module 120 is prestored in the EEPROM module 51 of the BMC module 50 on the motherboard 20 of the computer product 10. In practice, the management control programs and configuration data are used by various different hardware components, such as FRU (Field Replaceable Unit) components, SDR (Sensor Data Record) memory, fan speed mapping table, to name just a few.

The boot responding module 210 is capable of responding to a booting event 302 on the computer product 10 (i.e., when the computer product 10 is powered on or restarted) by issuing an enable message to activate the product ID code reading module 220. As shown in FIG. 2, in practical implementation, for example, this boot responding module 210 is integrated to the BIOS module 40 on the motherboard 20 of the computer product 10, such that the boot responding module 210 can be automatically activated for execution during the booting of the computer product 10.

The product ID code reading module 220 is capable of being activated by the enable message from the boot responding module 210, and when activated, is capable of reading the SKU_ID product ID code embedded in the product ID code embedding module 110 stored in the SMBIOS partition 41 of the BIOS module 40. As shown in FIG. 2, in practical implementation, for example, this product ID code reading module 220 is integrated as a routine to the BIOS module 40 on the motherboard 20 of the computer product 10, such that when being executed, it is capable of reading the embedded SKU_ID product ID code from the SMBIOS partition 41 of the BIOS module 40. The retrieved SKU_ID product ID code is then transferred by the CPU 30 via the KCS bus interface to the BMC module 50 for further processing by the management control program loading module 230.

The management control program loading module 230 is capable of using the SKU_ID product ID code retrieved by the boot responding module 210 as a keyword for retrieving the corresponding set of control program and configuration data from the management control program library module 120 and loading them for initialization of the computer product 10. As shown in FIG. 2, in practical implementation, for example, this management control program loading module 230 is integrated to the BMC module 50 on the motherboard 20 of the computer product 10.

Figure 3:
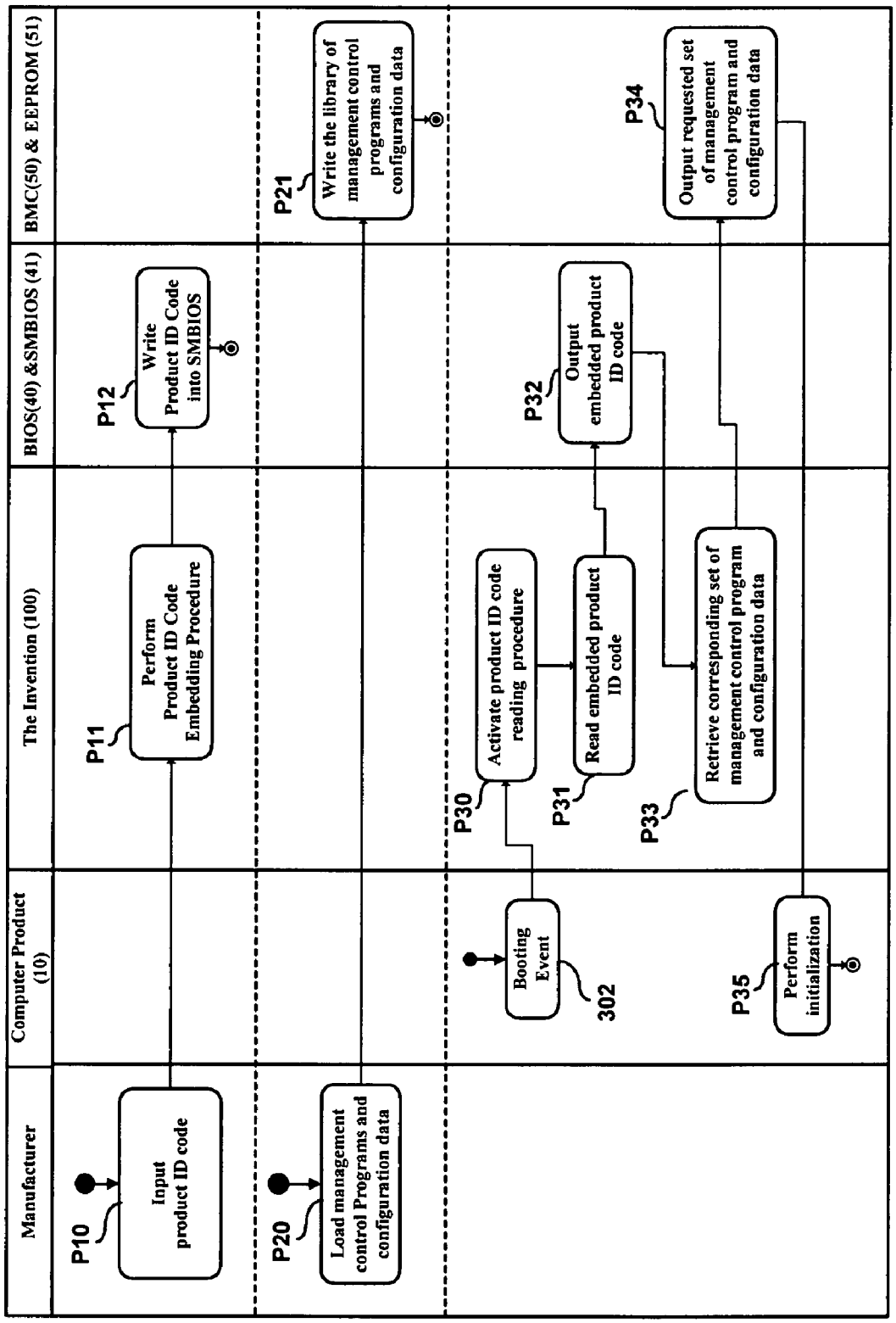
FIG. 3 is an activity diagram showing the activities performed by the universal computer product hardware configuration initialization handling system of the invention.

The following is a detailed description of a practical application example of the universal computer product hardware configuration initialization handling system of the invention 100 during actual operation, with reference to FIG. 3. The operation of the invention includes two stages: a manufacture stage and a utilization stage.

During the manufacture stage of the computer product 10 in factory, the manufacturer can utilize the product ID code embedding module 110 to embed a unique product ID code (denoted by SKU_ID) that is uniquely assigned to the particular model of the computer product 10 corresponding to a particular hardware configuration that is specifically ordered by the customer (as the activity P10 shown in FIG. 3). This manufacturer-initiated operation then activates the product ID code embedding module 110 to perform a product ID code embedding procedure (as the activity P11 shown in FIG. 3), causing the manufacturer-inputted SKU_ID product ID code to embedded with the format of SMBIOS Type 11 data structure in the SMBIOS partition 41 of the BIOS module 40 (as the activity P12 shown in FIG. 3). The product ID code embedding procedure is then ended. In addition, the manufacturer needs to gather all the sets of management control programs and configuration data that are associated with all the possible hardware components that can be optionally installed on the computer product 10 based on customer specifications, and then assemble these management control programs and configuration data as a management control program library module 120 (as the activity P20 shown in FIG. 3), and then embed the management control program library module 120 for permanent storage in the EEPROM module 51 of the BMC module 50 (as the activity P21 shown in FIG. 3). After the computer product 10 is readily manufactured, it is then shipped to the customer.

During the utilization stage (i.e., after the computer product 10 has been shipped to the customer and is actually utilized by the customer), the power-on of the computer product 10 initiates a booting event 302 on the computer product 10. The booting event 302 causes the boot responding module 210 to respond by issuing an enable message to activate the product ID code reading module 220 to read the embedded SKU_ID product ID code from the SMBIOS partition 41 of the BIOS module 40 (as the activities P30 and P31 shown in FIG. 3). Next, the management control program loading module 230 is activated to use the retrieved SKU_ID product ID code retrieved by the boot responding module 210 as a keyword for retrieving the corresponding set of control programs and configuration data from the management control program library module 120 (as the activity P33 shown in FIG. 3), causing the BMC module 50 to gain access to the EEPROM module 51 and output the requested management control program and configuration data (as the activity P34 shown in FIG. 3). The retrieved management control program and configuration data are then loaded into the BMC module 50 for initialization of the hardware configuration of the computer product 10 (as the activity P35 shown in FIG. 3). This completes the booting of the computer product 10, and the computer product 10 is ready for operation based on its current hardware configuration.

If the computer product 10 is refashioned in such a manner that a new hardware component is added to the motherboard 20, then the manufacturer can simply input the corresponding SKU_ID product ID code of the new hardware configuration for embedding in the SMBIOS partition 41 of the BIOS module 40 with the format of SMBIOS Type 11 data structure. Thereafter, when the computer product 10 is powered on, the same procedures P30-P35 will be repeated again for initialization of the newly-fashioned hardware configuration of the computer product 10.

In conclusion, the invention provides a universal computer product hardware configuration initialization handling method and system for use with computer products of various different models having different hardware configurations for providing these different models of computer products with a universal hardware configuration initialization handling function. The proposed method and system is characterized by the embedding of a unique identification code that is specific to each particular model of computer product in the SMBIOS and the embedding of the associated control programs and configuration data of all replaceable system components in the BMC. This allows the initialization process of each model of computer product to first read SMBIOS for the identification code and then retrieve the corresponding set of control programs and configuration data from the SMC for system initialization. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A universal computer product hardware configuration initialization handling method for use on a computer product that is configurable with various different hardware configurations for the purpose of providing the computer product with a universal hardware configuration initialization capability, which comprises;

during manufacture stage,
    embedding a unique product identification code in the computer product that has been uniquely assigned to the particular model of the computer product; and
    prestoring a manufacturer-collected library of modularized management control programs and configuration data corresponding to a number of possible hardware configurations in the computer product;

and during utilization stage,
    responding to a booting event on the computer product by issuing an enable message;
    responding to the enable message by reading the embedded product identification code in the computer product; and
    by using the product identification code as a keyword, retrieving the corresponding set of management control program and configuration data prestored in the computer product and loading them for initialization of the computer product.

2. A universal computer product hardware configuration initialization handling system for use with a computer product that is configurable with various different hardware configurations for the purpose of providing the computer product with a universal hardware configuration initialization capability, which comprises:

a product identification code embedding module, which is used to embed a unique product identification code in the computer product that has been uniquely assigned to the particular model of the computer product;

a management control program library module, which is used to prestore a manufacturer-collected library of modularized management control programs and configuration data corresponding to a number of possible hardware configurations for the computer product;

a boot responding module, which is capable of responding to a booting event on the computer product by issuing an enable message;

a product identification code reading module, which is capable of responding to the enable message from the boot responding module by reading the product identification code stored in the product identification code embedding module; and a management control program loading module, which is capable of using the product identification code retrieved by the boot responding module as a keyword for retrieving the corresponding set of management control program and configuration data from the management control program library module and loading them for initialization of the hardware configuration of the computer product.

3. The universal computer product hardware configuration initialization handling system of claim 2, wherein the computer product is a network server.

4. The universal computer product hardware configuration initialization handling system of claim 2, wherein the computer product is a desktop computer.

5. The universal computer product hardware configuration initialization handling system of claim 2, wherein the computer product is a notebook computer.

6. The universal computer product hardware configuration initialization handling system of claim 2, wherein the product ID code embedding module is integrated to a BIOS (Basic Input/Output System) module.

7. The universal computer product hardware configuration initialization handling system of claim 6, wherein the product ID code embedding module is embedded in an SMBIOS (System Management BIOS) partition of the BIOS module with SMBIOS Type 11 format.

8. The universal computer product hardware configuration initialization handling system of claim 7, wherein the SMBIOS Type 11 formatted product identification code is stored in a flash memory.

9. The universal computer product hardware configuration initialization handling system of claim 2, wherein the management control program library module is permanently integrated for storage in a storage area of a BMC (Baseboard Management Controller) module predefined for storage of management control programs and configuration data.

10. The universal computer product hardware configuration initialization handling system of claim 9, wherein the storage area of the BMC module is an EEPROM (Electrically Erasable and Programmable Read-Only Memory) unit.

* * * * *